United States Patent
Scott et al.

(10) Patent No.: US 8,543,081 B2
(45) Date of Patent: Sep. 24, 2013

(54) METHOD OF INTEGRATING EMERGENCY INFORMATION IN A MOBILE DEVICE

(75) Inventors: Sherryl Lee Lorraine Scott, Waterloo (CA); Earl Friedberg, Waterloo (CA); Jeffery Charles Bos, Waterloo (CA); Leonid Vymenets, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 448 days.

(21) Appl. No.: 12/361,052

(22) Filed: Jan. 28, 2009

(65) Prior Publication Data

US 2010/0190467 A1    Jul. 29, 2010

(51) Int. Cl.
*H04M 11/04*    (2006.01)

(52) U.S. Cl.
USPC .................................... 455/404.1; 455/404.2

(58) Field of Classification Search
USPC ................ 455/404.1, 466, 404.2, 411, 414.2, 455/521
See application file for complete search history.

(56) References Cited

U.S. PATENT DOCUMENTS

| | | | |
|---|---|---|---|
| 5,742,666 A | 4/1998 | Alpert | |
| 5,933,080 A | 8/1999 | Nojima | |
| 6,574,484 B1 | 6/2003 | Carley | |
| 7,466,235 B1 | 12/2008 | Kolb | |
| 2002/0131330 A1 | 9/2002 | Zion et al. | |
| 2003/0076932 A1 | 4/2003 | Andrew | |
| 2003/0104790 A1 | 6/2003 | Ylitalo | |
| 2004/0024706 A1 | 2/2004 | Leduc | |
| 2004/0103000 A1 | 5/2004 | Owurowa et al. | |
| 2004/0203576 A1 | 10/2004 | Droste et al. | |
| 2004/0203622 A1 | 10/2004 | Esque et al. | |
| 2005/0151642 A1 | 7/2005 | Tupler et al. | |
| 2006/0026689 A1 | 2/2006 | Barker et al. | |
| 2006/0079269 A1 | 4/2006 | Sorotzkin | |
| 2006/0142057 A1 | 6/2006 | Schuler et al. | |
| 2006/0172720 A1 | 8/2006 | Islam et al. | |
| 2007/0102527 A1 | 5/2007 | Eubank et al. | |
| 2007/0117574 A1 | 5/2007 | Watanabe | |
| 2007/0135043 A1 | 6/2007 | Hayes et al. | |
| 2007/0243853 A1 | 10/2007 | Bumiller et al. | |
| 2008/0005301 A1 | 1/2008 | Li et al. | |
| 2008/0070546 A1 | 3/2008 | Lee | |
| 2008/0080687 A1 | 4/2008 | Broms | |

(Continued)

FOREIGN PATENT DOCUMENTS

| | | |
|---|---|---|
| CA | 2691345 | 7/2010 |
| DE | 10064978 C1 | 7/2002 |

(Continued)

OTHER PUBLICATIONS

Extended European Search Report dated Jul. 6, 2009 Issued in reference to European Patent Application No. 09151568.4.

(Continued)

*Primary Examiner* — Tu X Nguyen
(74) *Attorney, Agent, or Firm* — Finnegan, Henderson, Farabow, Garrett & Dunner LLP

(57) ABSTRACT

A wireless communications device displays an emergency information screen presenting emergency contact information for one or more emergency contacts. This emergency contact information is automatically integrated from the address book by identifying contacts in the address book that have been designated by the owner of the device as emergency contacts. The device can automatically update the emergency contact information by periodically polling the address book to ascertain whether any changes have been made to the contact information.

16 Claims, 7 Drawing Sheets

(56) References Cited

U.S. PATENT DOCUMENTS

| | | | |
|---|---|---|---|
| 2008/0166992 A1 | 7/2008 | Ricordi | |
| 2008/0284587 A1 | 11/2008 | Saigh et al. | |
| 2009/0005068 A1* | 1/2009 | Forstall et al. | 455/456.1 |
| 2009/0047923 A1* | 2/2009 | Jain et al. | 455/404.1 |
| 2009/0205041 A1 | 8/2009 | Michalske | |
| 2010/0069099 A1 | 3/2010 | Dunn et al. | |
| 2010/0190467 A1 | 7/2010 | Scott et al. | |
| 2011/0041102 A1 | 2/2011 | Kim | |
| 2011/0088003 A1 | 4/2011 | Swink et al. | |

FOREIGN PATENT DOCUMENTS

| | | |
|---|---|---|
| DE | 10323582 A1 | 12/2004 |
| EP | 11709696 A1 | 1/2002 |
| EP | 2214385 | 8/2010 |
| GB | 2401285 A | 11/2004 |
| JP | 2004-120467 | 4/2004 |
| WO | 01/41458 | 6/2001 |
| WO | 2004/051976 A2 | 6/2004 |
| WO | 2004054278 A2 | 6/2004 |
| WO | 2004/082190 A2 | 9/2004 |
| WO | 2004/104898 | 12/2004 |
| WO | 2005053337 | 6/2005 |
| WO | 2005/069676 | 7/2005 |
| WO | 2006135120 A | 12/2006 |
| WO | 2007/118331 A1 | 10/2007 |
| WO | 2007118331 A | 10/2007 |

OTHER PUBLICATIONS

European Search Report for EP Application No. 09151567.6 dated May 14, 2009.

"3rd Generation Partnership Project; Technical Specification Group Services and System Aspects; Man-Machine Interface (MMI) of the User Equipment (UE) (Release 7)," 3GPP TS 22.030 v7.0.1 (Jul. 2005).

"I.C.E. (In Case of Emergency) Initiative [Edited]," Cingular Customer Forums, Aug. 4, 2005, Retrieved from http://forums.cingular.com/cng/board/message?board.id=announcements&message.id=206.

"ICE Your Cell Phone for Safety," CBS News, London, Jul. 26, 2005, CBS Broadcasting, Inc., Retrieved from www.cbsnews.com/stories/2005/07/26/earlyshow/printable711715.shtml.

"ICE," Retrieved from http://www.ci.miramar.fl.us/fire/ice.htm on Mar. 31, 2006.

Chaves, Susan, "ICE First application turns cell phones into lifesavers," The Darien Time, Darien, Connecticut, Mar. 16, 2006, Retrieved from http://www.acorn-online.com/news/publish/article_5358.shtml.

Coates, Sam, "ICE Cell Phone Plan Would Help Rescurers; Idea to Designate Next of Kin in Electronic Address Book is Gaining Popularity; [Final Edition]," The Washington Post, Jul. 18, 2005, p. A.06, Washington, D.C.

English-language translation of Korean Office Action that issued on Mar. 25, 2010 from corresponding Korean Patent Application No. 10-2008-7027918.

Hallburn, Mark, "Putnam county Debuts ICE Program," Putnamlive.com, Retrieved from the Internet URL:http://web.archive.org/web/20051210102349/http://putnamlive.com/PutnamCountyDebutsICEProgram.html.

Hibbert, David, "Help Out in a Crisis—With Ice," Lockergnome LLC, Jul. 14, 2005, Retrieved from www.channels.lockergnome.com/mobile/archives/20050714_help_out_in_a_crisis_with_ice.phtml.

MacInnes, Alexander, "Safety campaign urges storing contact numbers on cellphones," Herald News, Aug. 3, 2005, North Jersey Media Group (2005), Retrieved from www.northjersey.com.

Meyers, Michelle, "ICE your cell phone," CNET News.com, Jul. 19, 2005, Retrieved from http://news.com.com/2061-10800 3-5795310.html.

Morrison, Michael, "Blackberry in a SnapR," Jul. 1, 2005, SAMS, XP007904690 ISBN: 0-672-32670-1.

Office Action for U.S. Appl. No. 12/361,052 dated Jun. 30, 2011 (8 pages).

Zatz, Arline, "Star of Life," Rescue-EMS Magazine, Jul./Aug. 1992, Retrieved from www.angelfire.com/co/fantasyfigures/staroflife.html.

Advisory Action for U.S. Appl. No. 12/361,116 dated Nov. 14, 2011 (3 pages).

European Search Report for EP Application No. 09151568.4 dated Jun. 7, 2010 (5 pages).

Extended European Search Report dated May 20, 2009, issued in reference to European Patent Application No. 09151567.6.

Office Action for U.S. Appl. No. 12/361,084 dated Jan. 12, 2012 (9 pages).

Office Action for U.S. Appl. No. 12/361,084 dated Jul. 19, 2011 (10 pages).

Office Action for U.S. Appl. No. 12/361,084 dated Oct. 3, 2011 (9 pages).

Office Action for U.S. Appl. No. 12/361,116 dated May 17, 2011 (14 pages).

Office Action for U.S. Appl. No. 12/361,116 dated Sep. 27, 2011 (14 pages).

Chinese Office Action (with translation) for Chinese Application No. 200780022704.7 dated Feb. 29, 2012 (15 pages).

European Office Action for European Application No. 09163500.3 dated Dec. 12, 2012 (6 pages).

U.S. Advisory Action for related U.S. Appl. No. 12/361,084, dated Feb. 23, 2012 (3 pages).

U.S. Advisory Action for related U.S. Appl. No. 12/361,084, dated Nov. 14, 2012 (2 pages).

U.S. Office Action for related U.S. Appl. No. 12/361,084, dated Aug. 27, 2012 (10 pages).

U.S. Office Action for related U.S. Appl. No. 12/361,084, dated May 15, 2012 (9 pages).

U.S. Office Action for related U.S. Appl. No. 12/361,116, dated Dec. 20, 2012 (15 pages).

U.S. Office Action for related U.S. Appl. No. 13/551,386, dated Dec. 10, 2012 (14 pages).

U.S. Office Action for related U.S. Appl. No. 13/616,297, dated Nov. 15, 2012 (11 pages).

* cited by examiner

US 8,543,081 B2

METHOD OF INTEGRATING EMERGENCY INFORMATION IN A MOBILE DEVICE

CROSS-REFERENCE TO RELATED APPLICATIONS

This is the first application filed for the present technology.

TECHNICAL FIELD

The present technology relates generally to mobile devices and, in particular, to the management of emergency information on mobile devices.

BACKGROUND

Wireless communications devices (e.g. cell phones, smart phones, personal digital assistants, wireless-enabled tablets, or other types of mobile communication devices) are becoming ubiquitous. These wireless communications devices enable users to communicate (e.g. by voice, e-mail, text messages), to browse the Web, to calendar events, to store an address book of contacts, and to perform myriad other tasks.

Wireless communications devices can also be used to store personal information about the owner of the device, such as the name and alternate phone number of the owner in case the device is lost. In other instances, wireless communications devices have been used to store emergency information, sometimes referred to as In Case of Emergency ("ICE") information. For example, a device may store be used to identify a contact in the user's address book as an emergency contact person. One approach for doing so is to identify the contact with the acronym "ICE" prior the entry. So, for example, a contact John Smith would be listed as ICE—Smith, John in the address book to signify that John Smith is an emergency contact person for the owner of the device. The main problem with this approach is that it is not universally accepted and many first responders would not necessarily know what "ICE" or any other such designation means. A greater problem, however, is that the address book is typically only accessible by a user who has the password to the device. Thus, without knowledge of the password, the first responder cannot gain access to the emergency information stored within the device. Furthermore, since the way to access an address book varies from device to device, it may not be immediately apparent to the first responder how to quickly check the address book for emergency contacts.

One solution to this problem is provided by Warden Security. A login screen with a password prompt briefly presents a small amount of emergency information such as the name of a contact person to be called in case of emergency, the relationship of the contact person to the owner of the device, and some rudimentary health-related information (such as the owner's blood type). However, since only a very limited amount of emergency information is made available to the first responder, the usefulness of this prior-art technology is minimal. A further problem is that the contact information must be meticulously updated or else it is of no utility to the first responder, and in fact can even waste precious time while the first responder calls an out-of-date number. Improvements on this technology would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present technology integrates emergency contact information from an address book (or any other data source of contact information) into an emergency information screen on a wireless communications device. Certain contacts in the address book are designated as emergency contacts using one or more predetermined designations. These emergency contacts are shared with the emergency information screen in order to ensure that the contact information is up to date.

Thus, a main aspect of the present technology is a method of integrating emergency information into an emergency information screen displayed on a wireless communications device. The method entails accessing an address book containing a plurality of contacts, identifying one or more emergency contacts from the plurality of contacts stored in the address book by searching for a predetermined designation associated with each of the emergency contacts, and displaying emergency contact information for the one or more emergency contacts identified from the address book.

Another main aspect of the present technology is a computer readable medium comprising code which when loaded into memory and executed on a processor of a computing device is adapted to perform the steps of the preceding method.

Yet another main aspect of the present technology is a wireless communications device having a processor operatively coupled to a memory for receiving and storing contact information for a plurality of contacts in an address book. The device has a display operatively coupled to the memory and processor for displaying emergency contact information on an emergency contact screen for one or more emergency contacts that have been designated as emergency contacts from among the plurality of contacts stored in the address book. The processor and memory cooperate to transfer the emergency contact information for the one or more emergency contacts from the address book for display on an emergency contact screen.

The details and particulars of these aspects of the technology will now be described below, by way of example, with reference to the attached drawings.

Figure 1:
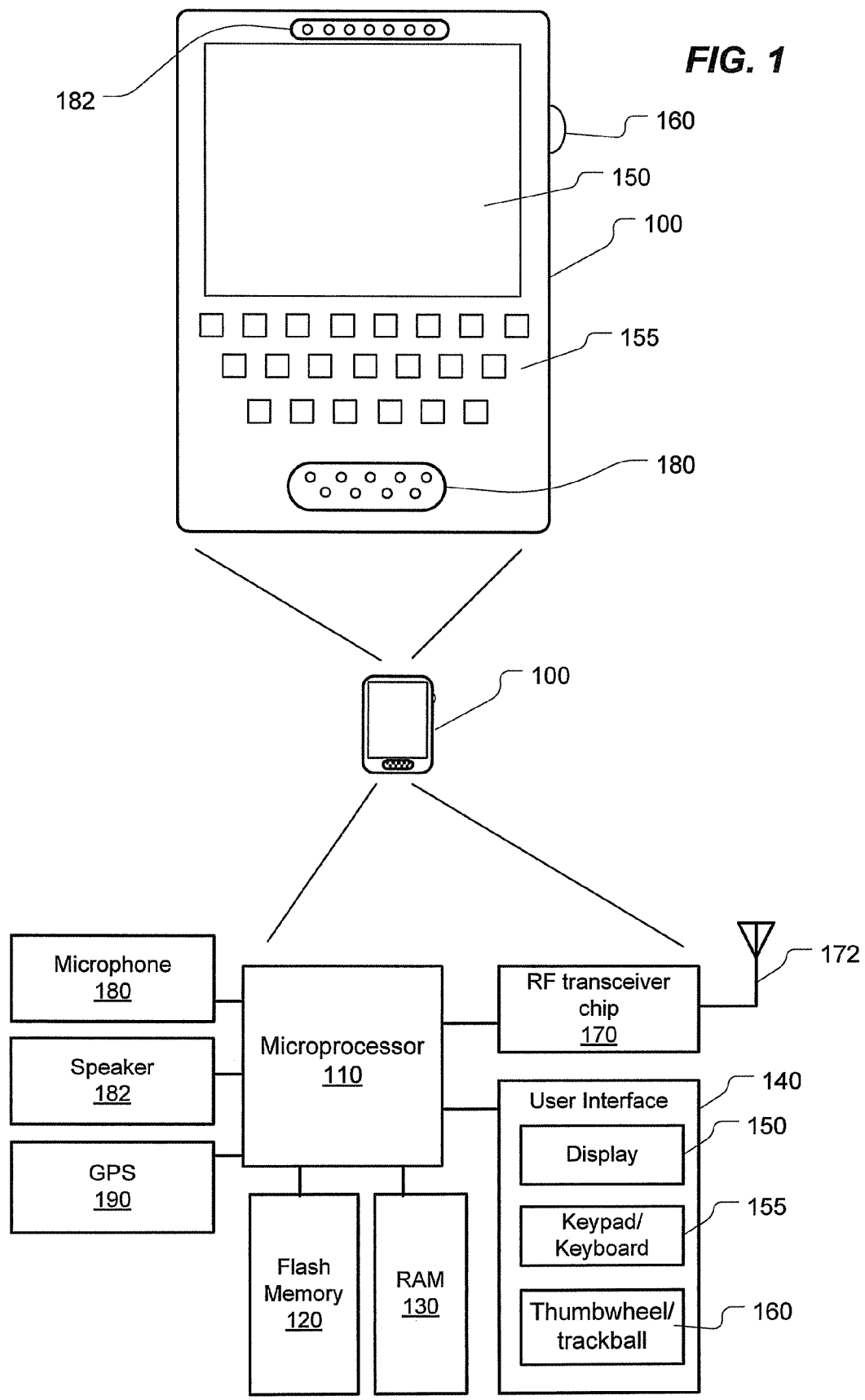
FIG. 1 is a schematic depiction of a wireless communications device in which the present technology can be implemented.

FIG. 1 depicts schematically a wireless communications device 100 on which the present technology can be implemented. For the purposes of this specification, the expression "wireless communications device" is meant to encompass a broad range of electronic communication devices that have processors and memory and which are capable of wireless ("over-the-air") communication. Accordingly, "wireless communications device" is meant to encompass wireless-enabled laptops, tablet PCs, portable, handheld or mobile electronic devices such as smart phones, cell phones, satellite phones, and wireless-enabled PDA's, etc., or any hybrid or multifunction device that has an RF transceiver.

Referring to FIG. 1, each wireless communications device 100 includes a microprocessor 110 or central processing unit (or simply a "processor") and a memory for storing data. The memory may include both a Flash memory 120 and a random access memory (RAM) 130. Each wireless communications device 100 also has a user interface 140 that includes a display (graphical user interface—GUI) 150, e.g. a LCD screen, a keyboard/keypad 155 and an optional thumbwheel/trackball 160. Each wireless communications device 100 includes an RF transceiver chip 170 for wireless communications, i.e. receiving and transmitting both voice and data. For voice communications, the wireless communications device 100 has a microphone 180 and a speaker 182. In addition, the wireless communications device 100 may include a Global Positioning System (GPS) chipset for obtaining position fixes from orbiting GPS satellites.

Figure 2:
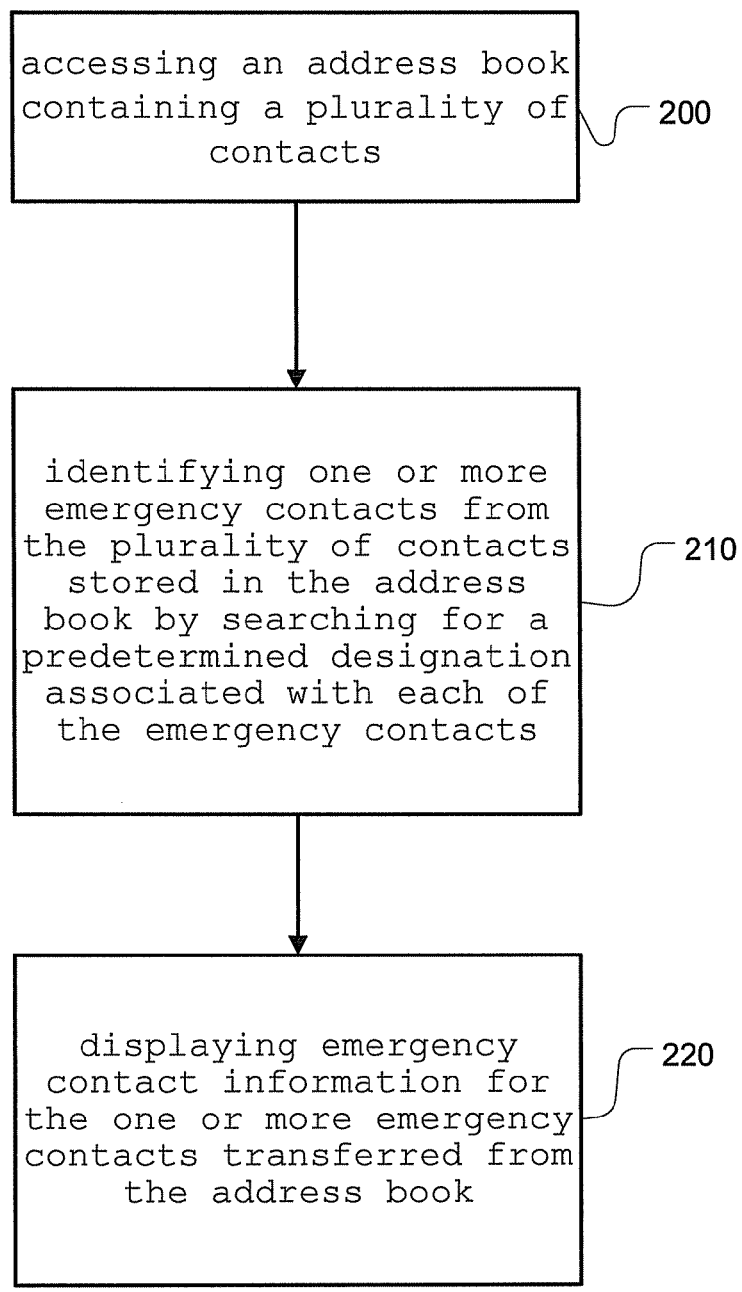
FIG. 2 is a flowchart outlining some of the main steps of a method of integrating emergency contact information into an emergency information screen from an address book in accordance with one or more implementations of the present technology.

FIG. 2 is a flowchart outlining some of the main steps of a method of integrating emergency contact information into an emergency information screen displayed on a wireless communications device in accordance with one or more implementations of the present technology. As depicted in FIG. 2, this novel method entails (at step 200) accessing an address book containing a plurality of contacts, or accessing any other data source of contact information, then (at step 210) identifying one or more emergency contacts from the plurality of contacts stored in the address book by searching for a predetermined designation associated with each of the emergency contacts, and then (at step 220) displaying emergency contact information for the one or more emergency contacts that have been identified and transferred from the address book for display on the emergency information screen.

In one main implementation of the technology, a first predetermined designation (e.g. "ICE1") is used to designate a main emergency contact and a second predetermined designation (e.g. "ICE2") is used to designate an alternate emergency contact. Further emergency contacts can be designated using other predetermined designations, e.g. "ICE3", "ICE4", etc.

In another main implementation of the technology, the method further entails determining a current location of the device and prioritizing the main and alternate emergency contacts in terms of proximity to the current location of the device. In other words, the device may re-order the emergency contacts based on the current location of the device. The current location of the device can be determined using the GPS receiver 190 or by any other suitable location-determining means such as radiolocation techniques or cell tower ID. In a variant, the device may have an override feature to enable the user to specify that, regardless of proximity, a certain contact or a certain subset of contacts are to be contacted preferentially.

The emergency information screen can be presented as part of a main login screen of the device. (The main login screen as the term is used herein is the first screen that the device presents and typically includes a password prompt, biometric check or other security means for restricting access to the device and the data stored therein. The emergency information screen can also be a separate screen that is linked to a user interface element on the main login screen of the device. This user interface element (e.g. button or link, etc.) enables direct access to the emergency information screen by bypassing a password prompt on the main login screen. The emergency information screen, as will be elaborated below, presents a variety of useful emergency-related information that might be used by the first responder in case of an emergency. For example, as will be elaborated below, this emergency information may include (in addition to the emergency contact information) owner information comprising personal information about an owner of the device, medical information about the owner, next-of-kin information (optionally prioritized in terms of proximity to the current location of the device), and/or travel-specific information, wherein the travel-specific information is optionally dynamically updated by the device based on the current location of the device. For the purposes of this specification, the term "owner" is meant to include not just the proprietor of the device but also the main user of the device.

The innovative features of the present invention will be described in greater detail below. However, before delving into these details, it is important to note that the emergency information is presented such that it is made accessible to a first responder without any knowledge of the password or login. In other words, while access to an address book or other data on the device usually requires inputting a password at a password prompt on a login screen, this emergency information is accessible from the login screen (or "main screen"). The information can be presented wholly or partially on the login screen (main screen) or a link, button or other user interface element can be provided to enable the first responder to access this information (thus bypassing the login or password prompt). For the purposes of this specification, the expression "first responder" includes not only a paramedic, doctor, nurse, emergency room worker, ambulance driver, emergency medical technician, etc., but also any other person who comes to the rescue of the owner of the wireless communications device in the event of an emergency.

This novel technology therefore enables the usual lockout/password screen to be bypassed by a first responder so that the first responder can access ICE information stored in a memory of the device or on a SIM card inserted into the device. While the device normally requires a password or other login credentials to access information on the device, the ICE information is made accessible to any first responder while protecting the privacy of all other information on the device. Non-ICE information, e.g. personal address book, e-mails, etc. is kept private assuming the device was locked when ICE information is first accessed. In other words, there is separation of the device-locking and the ICE-access functions, so that access to ICE does not compromise the basic device security and/or compromise SIM security.

Man-machine user interface events may be designated to unlock ICE information to thus bypass the normal login requirement. For example, pressing a "*" key (asterisk or 'star of life') three or four times, or holding a "*" key (asterisk or 'start of life') for two seconds. Advantageously, the asterisk has some similar characteristics as the 'star of life', and is common to many keyboards; the asterisk is a required key according to 3GPP specification. Pressing four times is a preferred implementation since pressing three times could be used for supplementary service codes according to the 3GPP specifications. To provide an increased ease of use, when the device is a cell phone and is in the locked state or idle state (and not accepting supplementary service codes), three "*" (asterisks) or 'star of life' presses also opens the device to the ICE information: such shortened code does not interfere with the potential use of three asterisks for supplementary service codes since these codes can only be entered when the cell phone is in an unlocked state. As some devices do not have a keypad, there may not be the "*" key available. Examples of such devices include MP3 players and other portable music devices, and cell phones for children that do not have a cell phone keypad but use a specially-adapted user interface. Such devices typically have some form of man-machine interface that allows access to menus. In those cases ICE information can be positioned as a menu item.

Figure 3:
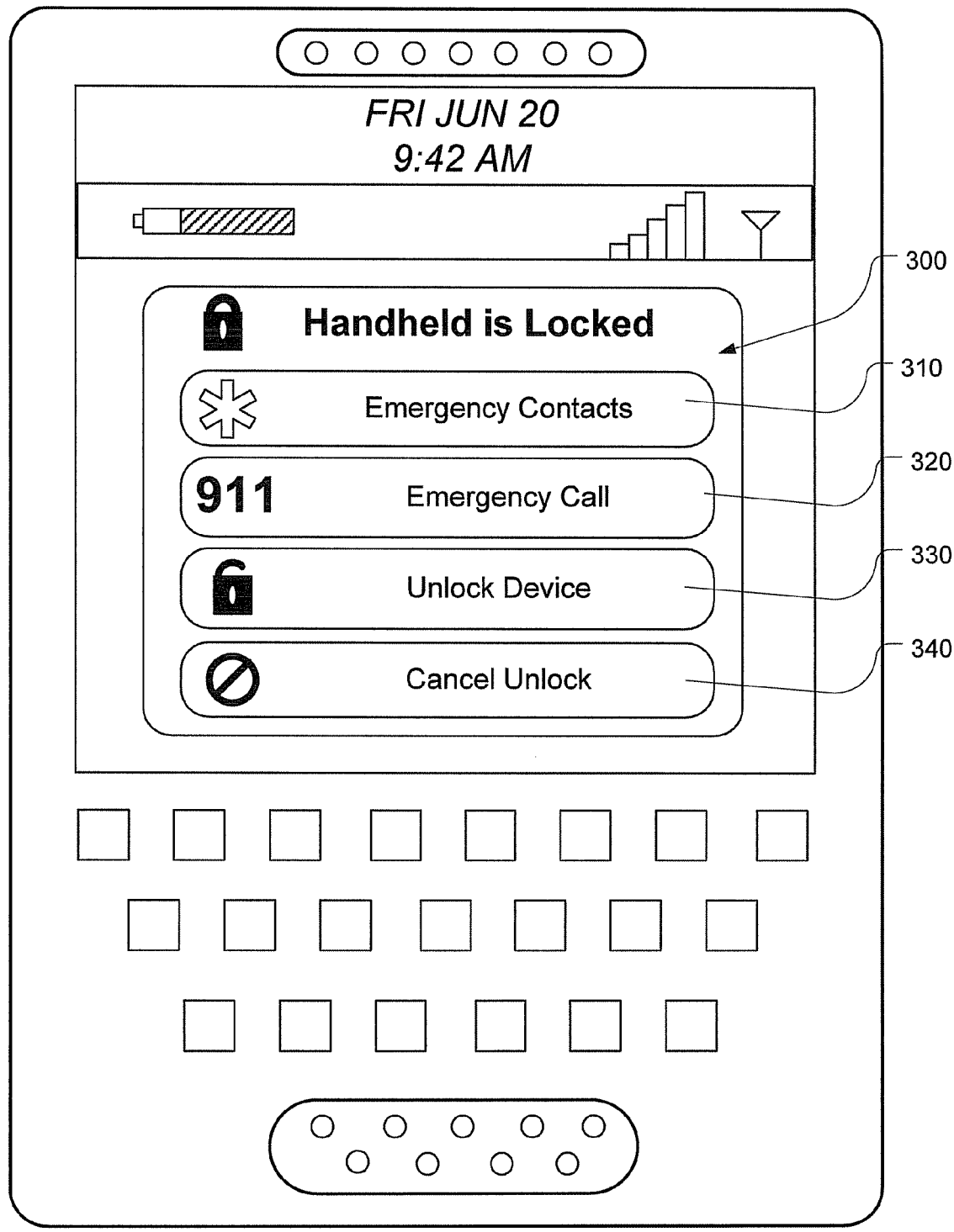
FIG. 3 schematically depicts a wireless communications device displaying, by way of example, a login screen that presents interface elements for accessing emergency contacts, to place an emergency call, or to unlock the device by entering a password.

FIG. 3 schematically depicts a wireless communications device displaying, by way of example, a login screen 300 that presents interface elements 310-340 for accessing emergency contacts, to place an emergency call, or to unlock the device by entering a password. As depicted in FIG. 3, the login screen 300 has a first user interface element 310 for accessing and contacting Emergency Contacts, a second user interface element 320 for making an Emergency Call (e.g. dialing 911, 999, 112 or whatever the local emergency number happens to be), a third user interface element 330 for unlocking the device (which leads to a password prompt or biometric input, etc.), and a fourth user interface element 340 to cancel the unlocking of the device. As will be appreciated, the first user interface element 310 for "Emergency Contacts" could be replaced with one that reads more generically "Emergency Information". Whatever the label, the user interface element (e.g. a button, link, hot key, keypad sequence, etc.) provides access to emergency information without requiring that the password be entered. Thus, a first responder can pick up the owner's wireless device and from the main login screen click on the Emergency Contacts button 310 in order to get a list of people to contact in case of emergency as well as other emergency information about the owner of the device.

As further depicted by way of example in FIG. 3, the Emergency Contacts button 310 may have a universally recognizable emergency information icon/symbol 310. As shown in this example, the Blue Star of Life (also known simply as the Star of Life) can be used since this is a generally recognizable emergency medical care symbol. The Star of Life is a six-barred cross, as shown in the figure. A different graphical indicator (e.g. another symbol, logo, word, letter, or abbreviation) could be used in lieu of the Star of Life to indicate that emergency information is available for the first responder.

The emergency information screen can be set up by the owner of the device using an ICE setup wizard for inputting various pieces of emergency information and for designating contacts in the address book as the emergency contacts (or as the In Case of Emergency "ICE" contacts). This ICE setup wizard can facilitate the task of setting up the In Case of Emergency (ICE) information on the device. Optionally, the setup of the device can be configured such that the user is prompted to enter ICE information when the device is first set up. The ICE setup wizard leads the user/owner through various screens to ensure that all important personal information and medical information is inputted, and that emergency contacts are designated from amongst the plurality of contacts listed in the address book. The device may optionally only present the Emergency Contacts button 310 shown in FIG. 3 if the ICE information has been entered. If no information has been entered, the main login screen shown in FIG. 3 can show the Emergency Contacts greyed out or simply absent from the screen. This will preclude the first responder from wasting precious time searching in the device for ICE information if no such information has been entered.

In addition to designated emergency contacts, the emergency information screen may include other relevant pieces of emergency-related information such as, for example, (i) owner information, (ii) medical information, (iii) next-of-kin information and (iv) travel-specific information. In certain implementations, the next of kin information may be subsumed within the emergency contacts (i.e. treated as the one and the same). Alternatively, the device may enable the user/owner to specify one or more next of kin distinct from the emergency contacts per se.

For example, the owner information may include first name, last name, work number, home number, mobile number, pager number, fax number, other number(s), PIN number, home address (street, city, state/province, ZIP/postal code, country), webpage, and other notes.

For example, the medical information may include health issues, medication, medic alert, medical history, allergies, blood type, personal/religious restrictions, organ donation and other notes.

For example, emergency contact person information (or next-of-kin information) may include the contact's (or next-of-kin's) first name, last name, work number, home number, mobile number, pager number, fax number, other number(s), PIN number, home address (street, city, state/province, ZIP/postal code, country), webpage, and other notes.

For example, the travel-specific information, which may be entered e.g. prior to embarking on a trip, may include the name of the tour company, the tour guide, his or her mobile number, work number, e-mail address, travel dates, travel itinerary, consulate/embassy contact information.

A further time-dependent and/or location-dependent trigger may be added to ensure that the travel-specific information is only presented if the GPS chipset provides a location reading that concords with the itinerary and if the time and date correspond to the travel dates. When the trip is over, the user can manually delete the travel-specific information. Alternatively, the device can automatically delete its travel-specific information by intelligently observing that the date and time and/or GPS position fix no longer concord with the travel dates and/or travel destinations. A further feature may be provided to enable a user to specify that travel-specific information is to be retained. This is useful, for example, in the case where a device owner travels frequently to the same destination. For example, if the device owner travels frequently to a certain city, the travel-specific information about that city (preferred contacts in that city, preferred hospital in that city, etc.) can be retained in the device.

In a variant, in addition to any travel-specific information, the wireless device can store location-dependent emergency information. Location-dependent emergency information provides emergency information based on the current location of the device. For example, a user who spends a substantial amount of time in two or three different cities may wish to specify emergency information for each of the different cities. When in City A, the emergency contact persons may be persons A1 and A2 whereas in City B his contacts are persons B1 and B2. Similarly, the emergency contact information may specify one hospital for City A and a different hospital for City B. The device can use a location-determining subsystem (e.g. GPS positioning or even a coarser technique like cell tower ID) to determine which city the user is presently in. The device would then automatically switch the emergency contact information based on the current location of the device. In other words, location-dependent emergency information can be dynamically updated to ensure that the most geographically relevant emergency information is presented to a first responder.

In another variant, the location-dependent emergency information may be presented in different languages depending on the current location of the device. In other words, the language used to present the emergency information can be dynamically updated based on the current location of the device. The device can use GPS, radiolocation, cell tower ID or any other location-determining means to determine its current location. The device can then compare its location to a geographical information database to determine the language spoken by the local population in the country, region or city corresponding to the current location of the device. The device can then automatically translate the emergency information into the local language. For example, if the device detects that it is in Italy, then the device in this particular implementation will translate the stored emergency information into Italian so that a first responder will be able to fully comprehend the emergency information stored in the device. In one implementation, contact names would stay the same (remain in their native, default language) but the field labels used to describe the contacts would be automatically translated. Appropriate country codes or international dialing prefixes could be added automatically. In some cases, the current location may correspond to more than one local language. In those cases, a "change language" option can be presented onscreen to enable the first responder to switch to a more familiar language if desired.

Figure 4:
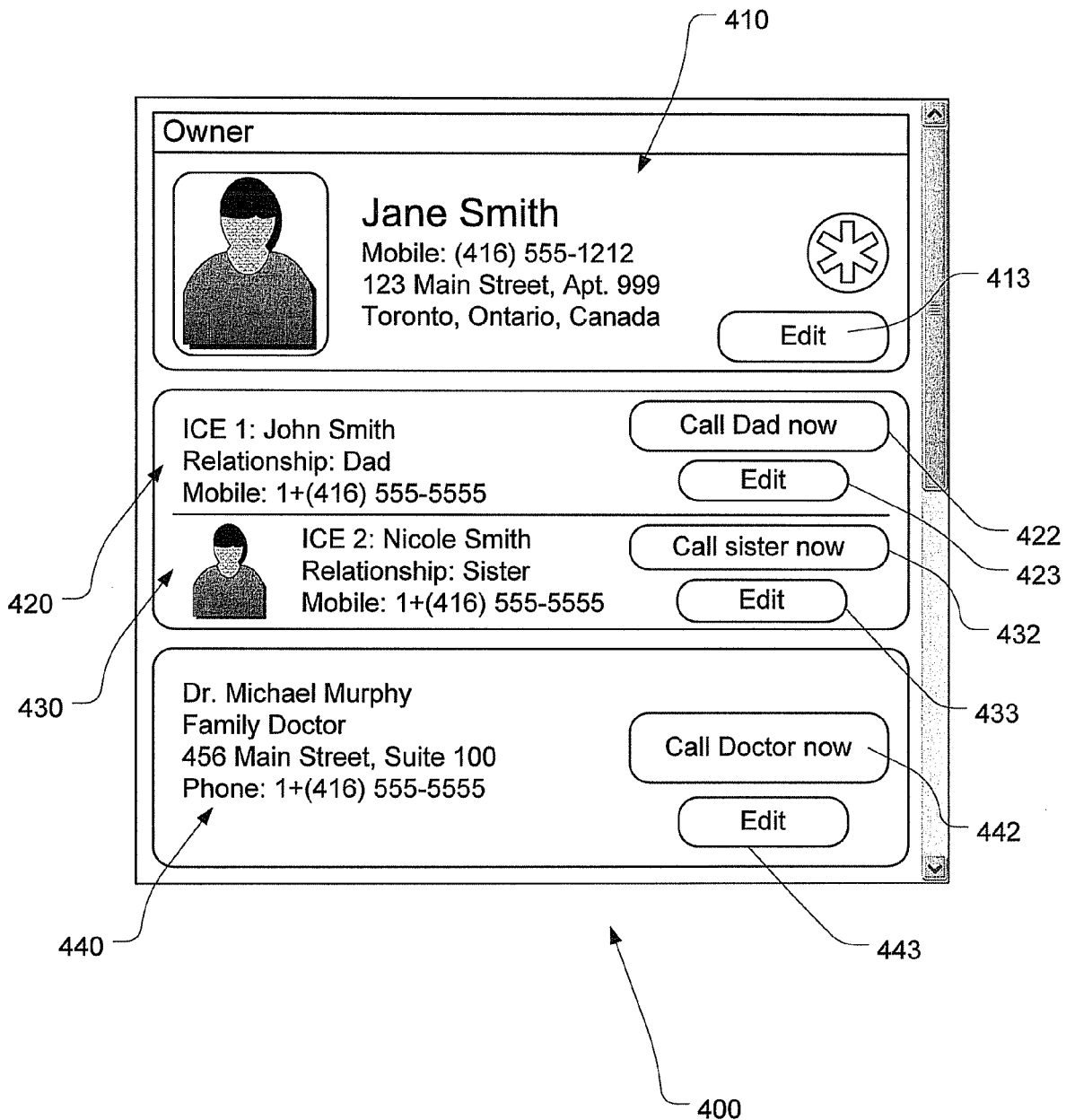
FIG. 4 schematically depicts, by way of example, an emergency information screen (or an "In Case of Emergency" Screen) showing owner information and emergency contacts.
Figure 5:
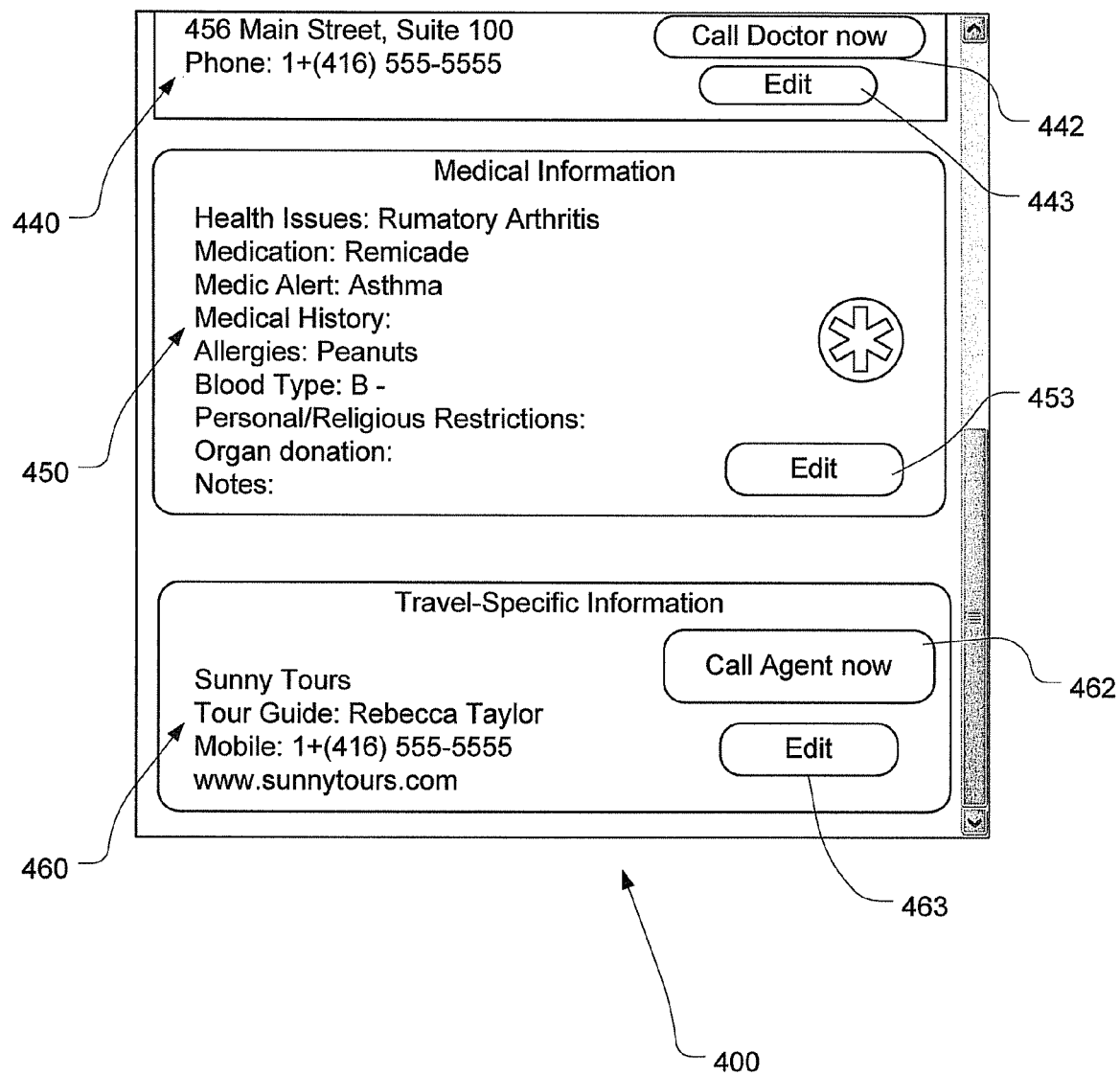
FIG. 5 schematically depicts, by way of example, the emergency information screen of FIG. 4 after scrolling down to reveal additional emergency information including medical information and travel-specific information.

In use, assuming the wireless communications device is locked out when the first responder arrives on the scene, the first responder will realize that the person in distress is the owner of an ICE-equipped wireless communications device. The first responder will recognize that the device contains ICE information either due to an external sticker on the case of the device or by virtue of a watermark or icon showing on the main login screen. The first responder clicks on the "Emergency Contacts" (or "Emergency Information") button 310 of the login screen as shown in FIG. 3. This button 310 is linked to an ICE information screen 400 presented by way of example in FIG. 4 and FIG. 5. The ICE information screen (or "emergency information screen") 400 shown by way of example in FIGS. 4 and 5 presents all or a subset of the emergency information entered into the device. The Star of Life or other icon may be depicted on this screen to provide immediate visual confirmation to the first responder that he or she has arrived at the correct screen.

As shown in FIG. 4, some key owner information 410 is presented to help identify the person in distress, i.e. the owner or user of the device. A photograph may be included to help identify the person in distress (the device owner). During setup, the device (if equipped with a digital camera) may instruct the owner how to take a self-portrait for the purposes of incorporating a digital photograph into the owner information portion of the ICE information screen 400. In addition, the owner's name, mobile number, address or other information can be provided to further help identify the owner.

As further shown in FIG. 4, the emergency information includes at least two contact persons (ICE 1 designated by 420 and ICE 2 designated by 430), i.e. a main contact and at least one alternate contact. Although only two contacts 420, 430 are shown in the figure, it should be appreciated that the device may display three or more contacts. The relationship between the owner and each of the contacts can be provided as well (e.g. "Dad" or "Sister"). A user interface element "Call Dad now" 422 is presented to enable the first responder to speed dial the owner's father. A second user interface element "Call sister now" 432 enables the first responder to speed dial the owner's sister as an alternate contact. It should be appreciated that contact persons can be designated in an address book or drawn from any other data source of contact information that may be stored on, or accessible by, the wireless communications device.

Optionally, as mentioned above, these contacts can be ordered or prioritized in terms of their proximity to the current location of the device (or they can be manually ordered, if desired). These contacts may also be prioritized in terms of their availability. Their availability can be determined based on a shared calendar, based on calendar information exchanged between next of kin and owner, or by any other means. For example, as part of a data synchronization/reconciliation process, a wireless communications device may obtain shared calendar information from other persons on a periodic basis, thus enabling the device to dynamically re-prioritize the order of the emergency contacts based on their availability. In a more refined variant, the device could take into account both the proximity to the current location and the stated availability. In yet a further variant, the user of the device can specify for each emergency contact a time of day when that contact is likely to be responsive. For example, a certain next of kin may be known to go to bed early every night. Thus, if an accident occurs after that contact's bed time, then the device should not present that contact as the main contact. Similarly, a contact may be unavailable to respond to an emergency during work hours (e.g. an airline pilot). The availability times of each contact person can thus also be manually input by the owner when setting up the ICE application.

In addition to the owner information and the information about the contact persons/next of kin (labelled as ICE 1 and ICE 2 in FIG. 4), the ICE Information Screen 400 may provide doctor information 440 and a speed dial button (or other user interface element) 442 to initiate a voice call or other communication with the listed doctor (or his pager or his office, hospital, clinic, etc.). The ICE Information Screen 400 may also include an edit button 413 to access and edit the owner information from the ICE Owner Screen. Edit buttons 423, 433 can be provided to access the address book from the ICE Owner Screen to, for example, select new persons as the ICE contacts. Another edit button 443 may be provided to update the doctor information. These edit functions may require the input of a password or other security measure to ensure that access to the address book is limited to only those who are entitled to view the complete contents of the address book.

As depicted in FIG. 5, medical information 450 can be presented. This medical information can present important information about allergies, medications that the owner is currently taking, blood type, personal/religious restrictions on blood transfusions, resuscitation, etc. or organ donation preferences, to name but a few. This screen may also contain an edit button 453 to access and edit the medical information. As further depicted in FIG. 5, travel-specific information may also be presented where appropriate. If the owner is not traveling, this section may be suppressed or greyed out. This screen may also contain an edit button 463 to access and edit the travel-specific information. Edit functions may require a password or other security measure.

FIG. 5 schematically depicts, by way of example, the emergency information screen of FIG. 4 after scrolling down to reveal additional emergency information (namely the medical information and the travel-specific information). In other words, in the example presented in FIG. 4 and FIG. 5, the first responder can view all portions of this emergency information by scrolling up and down. Alternatively, the information can be presented by category of information on discrete pages with a main page linked hierarchically to each of the different categories (pages) of information for easy navigation.

In the foregoing example, the first responder is confined to either calling the dad or the sister using the two user interface elements 422, 432 displayed onscreen. In another implementation, once the first responder has called or attempted to call the main contact person and the first alternate contact person listed on the screen, the first responder may wish to send emails, instant messages, or PIN messages to these individuals, or to make further telephone calls to other alternate (backup) contacts. This can be accomplished by providing a full menu of other communication options such as, for example, options for emailing, sending a PIN message, pulling up further alternate contacts, etc. Indeed, to maximize the potential benefit of this novel technology, the owner/user should designate as many alternate contacts as possible. Since the designation of emergency contacts can be done expeditiously via the address book, this task is not inconvenient.

In one implementation of this novel technology, the device 100 designates a complete roster of potential contact persons in the address book for sharing with an ICE application that manages the emergency information screen. A complete roster of potential emergency contacts comprises the main contact, the first alternate contact and multiple alternate contacts in the event that the main contact and the first alternate contact are unavailable or unresponsive to the call from the first responder. A complete roster of emergency contacts can be created by designating contacts stored in the address book by using one or more predetermined designations. The predetermined designations can be an abbreviation or acronym such as ICE1, ICE2, ICE3, ICE4, ICE5, etc. or any other suitable word, combination of letters, combination of symbols or indicator. For example, an asterisk (*) can be used to designate the emergency contacts, or a series of asterisks (*,,*,**, ***, etc.) can be used to designate contacts from highest precedence to lowest. Whatever symbol, word or letter combination that is used as the predetermined designations, the device can identify the emergency contacts by parsing the data in the address book, i.e. searching for the predetermined designation(s). When a predetermined designation is found, the device flags the contact as being a designated emergency contact and then transfers the contact information to the emergency information screen or to the ICE application for managing and displaying the emergency information screen. The device can then poll the address book to ascertain whether any updates to the contact information need to be transferred over to the ICE application for display on the emergency information screen.

Thus, in one example implementation, there could be a plurality of emergency contacts (e.g. 5-10) defining a complete roster of potential contacts who are continually dynamically re-prioritized depending on location, time of day and stated availability. If the main contact is unresponsive, then the first responder can try the alternate contact. Even if only two emergency contacts are presented onscreen, as is the case in the present example, the first responder can optionally obtain further alternate contacts using this menu 1500. In a variant, the device can intelligently and dynamically update the contacts if the telephone call goes unanswered. If the call is unanswered, the device can then automatically select the next alternate contact from the list of emergency contacts, again based on the whatever filters are in place, e.g. location-based filters, time-based filters or availability-based filters. In any event, the device can automatically push this information to the ICE application when an emergency phone call goes unanswered. The first responder merely has to select the speed dial button for the next alternate contact. If the next alternate contact does not respond, the device keeps going down the list of alternate contacts until one does respond (or until the list is exhausted, in which case the device can optionally cycle back to the top of the list so that the first responder can then retry the main contact, the first alternate contact, etc.) Furthermore, the device may provide an option to "notify all" or "contact all" by sending a group e-mail or by sending a common text message (e.g. SMS, MMS) to a group of contacts (e.g. the entire roster of ICE contacts). The mode of communication may be selected based on device capability to ensure all contacts are able to receive the emergency message. A general notification e-mail (or other such communication) enables the first responder to efficiently advise all emergency contacts without having to send sequential individual communications. Alternatively, the device can propose alternate modes of communication for alerting one or more of the emergency contacts listed in the roster of emergency contacts. For example, if the contact cannot be reached by phone, the device can query the first responder whether he or she wishes to send a pre-formulated message to the contact via e-mail (or by some other mode communication). In a variant, the device can furthermore ask the first responder whether he or she wishes to send this same note or message to any other contacts currently not available by phone.

Figure 6A:
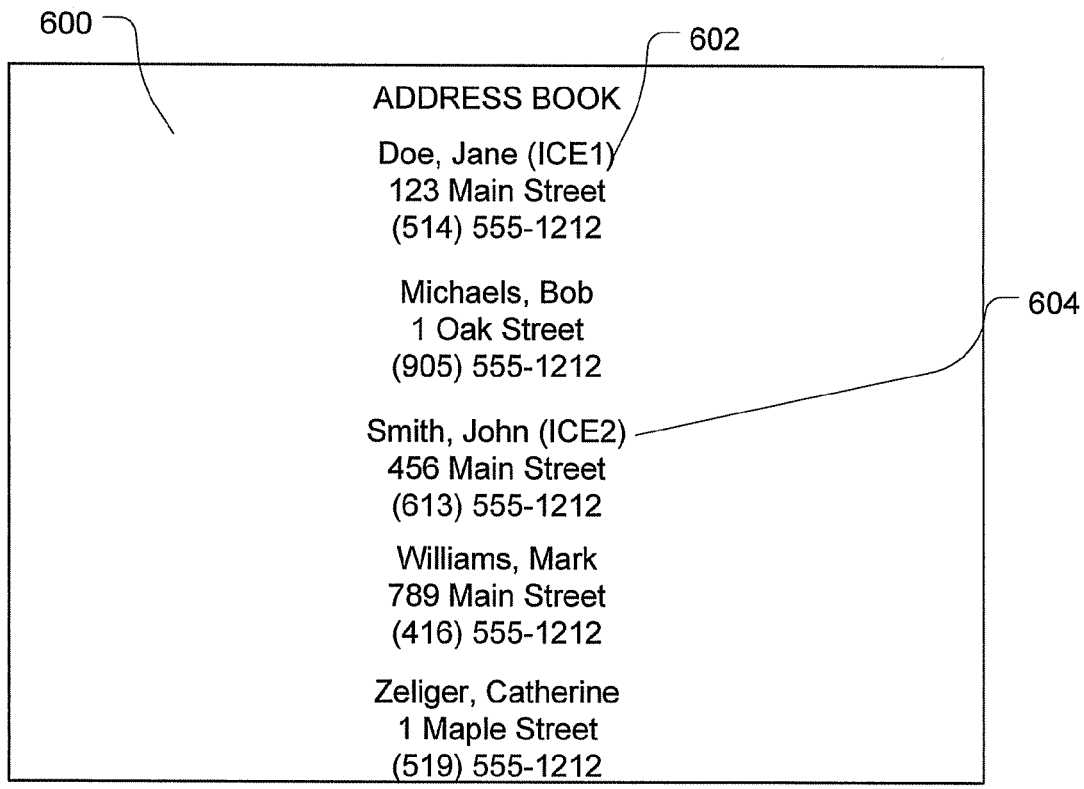
FIG. 6 schematically depicts emergency contacts designated with predetermined designations ICE1 and ICE2 in an address book.
Figure 6B:
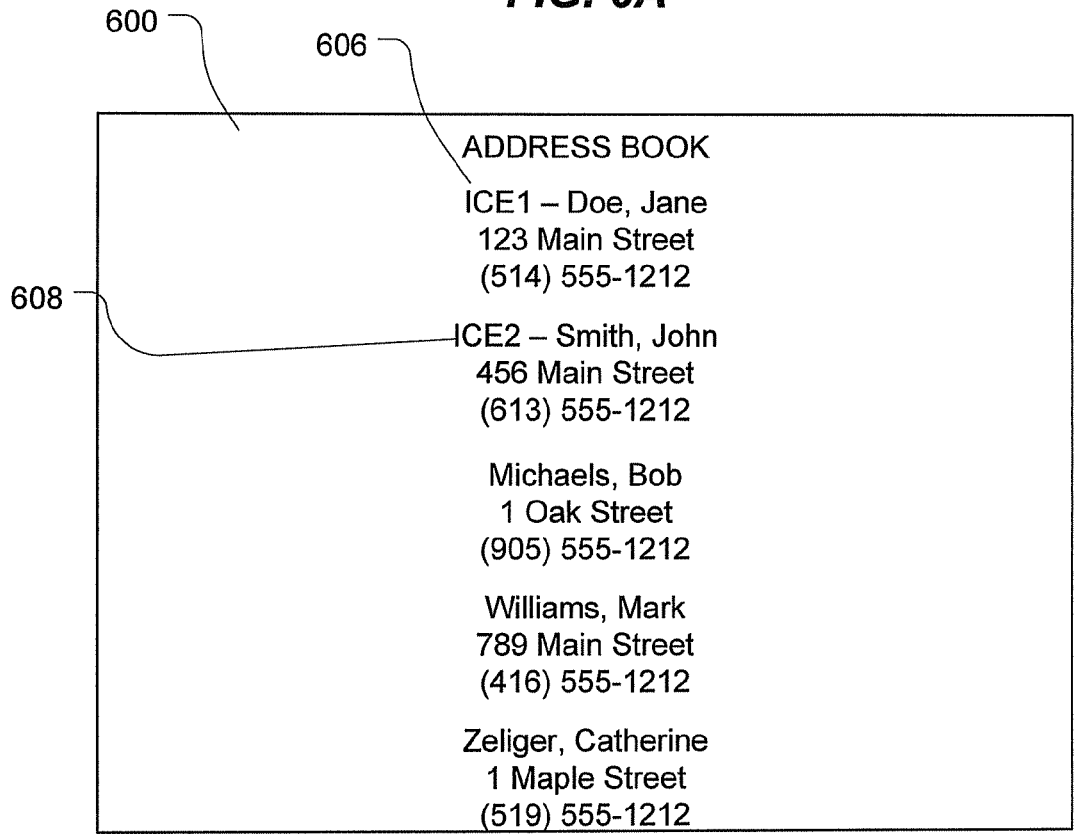

FIG. 6A schematically depicts emergency contacts designated with predetermined designations ICE1 and ICE2 (602, 604) in an address book 600 of a wireless communications device. The wireless communications device has a processor operatively coupled to a memory for receiving and storing the contact information for the plurality of contacts in the address book 600 shown by way of example in FIG. 6A. The device has a display operatively coupled to the memory and processor for displaying the emergency contact information on an emergency contact screen (or emergency information screen) for one or more emergency contacts (e.g. contacts) that have been designated as emergency contacts from among the plurality of contacts stored in the address book 600, in this example ICE1 and ICE2. FIG. 6B shows another way of designating the emergency by putting the predetermined designations 606, 608 (e.g. ICE1, ICE2) before each name instead of following each name in parentheses as was shown by way of example in FIG. 6A.

Figure 7:
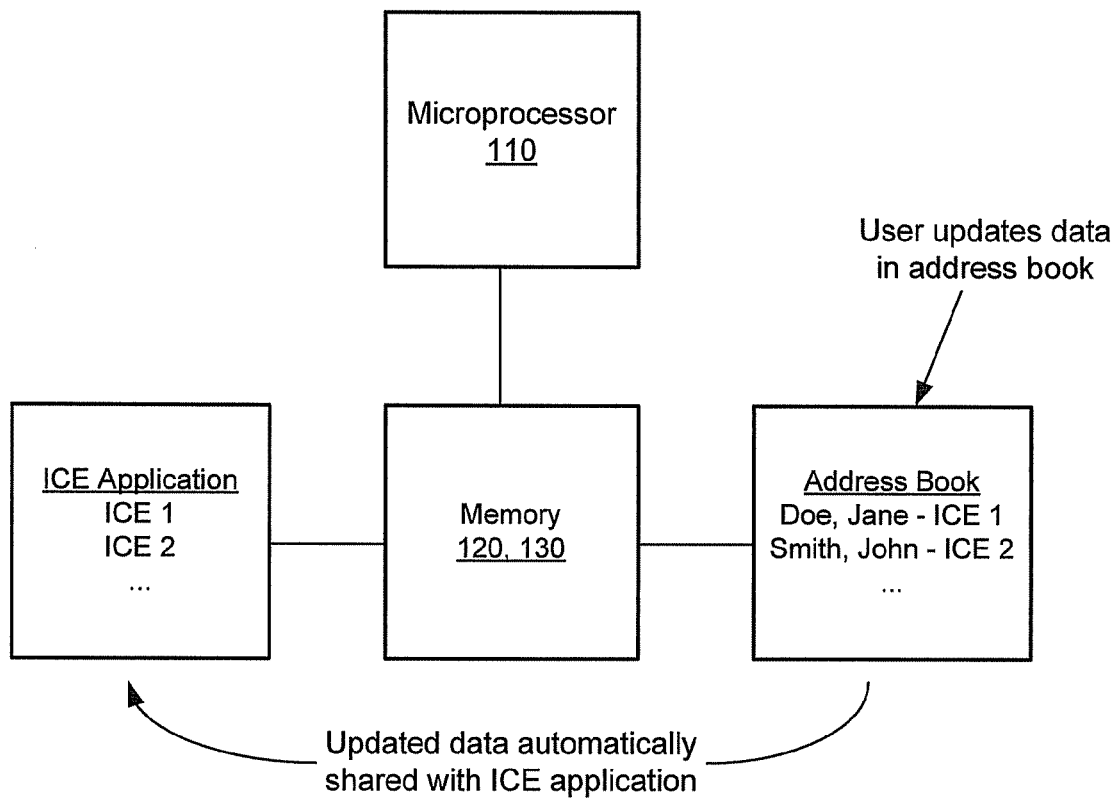
FIG. 7 schematically depicts the transfer of emergency contact information to an ICE application that manages and displays an emergency information screen.

The processor 110 and memory 120,130 cooperate to transfer the emergency contact information for the one or more emergency contacts (e.g. ICE1 and ICE2) from the address book 600 for display on the emergency contact screen (or emergency information screen) 300 as schematically depicted in FIG. 7. Any changes or updates made to the contact information for the designated contacts is automatically transferred for display on the emergency information screen 300 (or to the ICE manager that manages this information). The device can periodically poll the address book 600 to ascertain whether any changes have been made to any of the designated contacts. If a change is made to a designated contact or a new or different contact is designated as an emergency contact, the device can be configured to automatically push this information to the ICE manager for updating the emergency information screen 300.

From the foregoing, it should be apparent that this novel method and novel device provide unparalleled assistance to a first responder in the case of an emergency involving the owner of the device. By providing multiple emergency contacts, and by ensuring that the contact information is up to date, the first responder has a much better chance of reaching a next of kin or an emergency contact. By furthermore prioritizing these contacts dynamically, the contact selected is more likely to be available, responsive and proximal to the site of the distressed owner. By furthermore providing a fully panoply of personal, medical and travel-specific information, the first responder is given a complete picture about the owner, pre-existing medical conditions, medications currently being taken, and other relevant information that can literally make the difference between life and death.

The method steps disclosed in the present specification can be implemented as coded instructions in a computer readable medium. In other words, the computer readable medium contains software code to perform the foregoing steps when the computer readable medium is loaded into memory and executed on the microprocessor of the wireless communications device.

While the ICE information is stored in the memory of the device, the emergency information can also be backed up wirelessly and automatically by periodically transmitting updated information from the device to a server, e.g. to an enterprise relay server. Furthermore, in another implementation, the emergency information can be stored at a web server to enable emergency contacts to access that information using a web browser. For example, the device could send a link to the website which the emergency contact person accesses (e.g. using a pre-arranged password) in order to obtain all the needed emergency information about the owner of the device. Updates about the device owner's current location, current status, etc. can be pushed to the web server rather than disseminated to each emergency contact. In one variant, the device can be configured to notify one or more emergency contacts in the event that a different route is taken, the device heads to an alternate hospital, or if there's been a change in status (e.g. the emergency is deemed to have been a false alarm).

This new technology has been described in terms of specific implementations and configurations which are intended to be exemplary only. The scope of the exclusive right sought by the Applicant is therefore intended to be limited solely by the appended claims.

The invention claimed is:

1. A method, performed by a wireless communications device, of integrating emergency information into an emergency information screen displayable on the wireless communications device, the method comprising:
   automatically, and without user intervention, identifying one or more emergency contacts in an address book containing contact information for a plurality of contacts by searching the address book for a predetermined designation associated with each of the one or more emergency contacts and transferring the contact information for the one or more emergency contacts from the address book to an In Case of Emergency (ICE) application for display on the emergency information screen;
   polling the address book by the ICE application to ascertain whether any updates have been made to the one or more emergency contacts; and
   transferring the updates from the address book to the ICE application.

2. The method as claimed in claim 1 wherein a first predetermined designation is used to designate a main emergency contact and a second predetermined designation is used to designate an alternate emergency contact.

3. The method as claimed in claim 2 further comprising:
   determining a current location of the device; and
   prioritizing the main and alternate emergency contacts in terms of proximity to the current location of the device.

4. The method as claimed in claim 1 further comprising prompting a user to designate a new contact as an emergency contact when the new contact is added to the address book.

5. The method as claimed in claim 1 further comprising periodically reconciling contact information in the address book with contact information being presented on the emergency information screen.

6. The method as claimed in claim 1 wherein the contact information is presented on a main login screen of the device, the main login screen comprising a password prompt.

7. The method as claimed in claim 1 wherein the emergency information screen is linked to a user interface element on a main login screen of the device to enable direct access to the emergency information screen by bypassing a password prompt on the main login screen.

8. A computer readable medium comprising code which when loaded into memory and executed on a processor of a wireless communications device is adapted to cause the device to perform acts of:
   automatically, and without user intervention, identifying one or more emergency contacts in an address book containing contact information for a plurality of contacts by searching the address book for a predetermined designation associated with each of the one or more emergency contacts and transferring the contact information for the one or more emergency contacts from the address book to an In Case of Emergency (ICE) application for display on the emergency information screen;
   polling the address book by the ICE application to ascertain whether any updates have been made to the one or more emergency contacts; and
   transfer the updates to the ICE application.

9. The computer readable medium as claimed in claim 8 wherein the code is further adapted to cause the device to perform acts of:
   distinguishing a first predetermined designation used to designate a main emergency contact from a second predetermined designation used to designate an alternate emergency contact; and
   prioritizing the main and alternate emergency contacts in terms of proximity to a current location of the device.

10. A wireless communications device comprising:
    a processor operatively coupled to a memory for receiving and storing contact information for each of a plurality of contacts in an address book; and
    a display operatively coupled to the memory and processor for executing an In Case of Emergency Application (ICE) for displaying contact information on an emergency information screen for one or more emergency contacts that have been designated as emergency contacts from among the plurality of contacts stored in the address book,
    wherein the processor is configured to automatically, and without intervention, identify the one or more emergency contacts by searching the address book for a predetermined designation associated with each of the one or more emergency contacts and to automatically transfer the contact information for the one or more emergency contacts from the address book for display on the emergency information screen, and wherein the processor and memory further cooperate to poll the address book to ascertain whether any updates have been made to the one or more emergency contacts and to transfer the updates to the ICE application.

11. The device as claimed in claim 10 wherein a plurality of emergency contacts are designated as a main contact and one or more alternate contacts using predetermined designations.

12. The device as claimed in claim 11 further comprising a location-determining subsystem for determining a current location of the device to thereby enable the device to prioritize the plurality of emergency contacts in terms of proximity to the current location of the device.

13. The device as claimed in claim 10 wherein the processor and memory are configured to automatically poll the address book to update the contact information for the one or more emergency contacts presented on the emergency information screen.

14. The device as claimed in claim 10 wherein the processor and memory are configured to query the user whether a new contact being added to the address book should be designated as an emergency contact.

15. The device as claimed in claim 10 wherein the emergency information is presented on a main login screen of the device, the main login screen comprising a password prompt.

16. The device as claimed in claim 10 wherein the emergency information screen is linked to a user interface element on a main login screen of the device to enable direct access to the emergency information screen by bypassing a password prompt on the main login screen.

\* \* \* \* \*